US012319003B2

(12) United States Patent
Jones Poppescou et al.

(10) Patent No.: US 12,319,003 B2
(45) Date of Patent: Jun. 3, 2025

(54) COOLING UNIT WITH A SELF-LOCKING LATCH MECHANISM

(71) Applicant: Peridot Print LLC, Palo Alto, CA (US)

(72) Inventors: Ernesto Alejandro Jones Poppescou, Sant Cugat del Valles (ES); Wojciech Jerzy Krasowski, Sant Cugat del Valles (ES); Arturo Garcia Gomez, Sant Cugat del Valles (ES); Josep Maria Fernandez Sanjuan, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 757 days.

(21) Appl. No.: 17/309,760

(22) PCT Filed: Apr. 29, 2019

(86) PCT No.: PCT/US2019/029679
§ 371 (c)(1),
(2) Date: Jun. 17, 2021

(87) PCT Pub. No.: WO2020/222750
PCT Pub. Date: Nov. 5, 2020

(65) Prior Publication Data
US 2022/0055306 A1  Feb. 24, 2022

(51) Int. Cl.
*B22F 12/20* (2021.01)
*B29C 64/364* (2017.01)
*B33Y 30/00* (2015.01)
*B33Y 40/20* (2020.01)

(52) U.S. Cl.
CPC ............ *B29C 64/364* (2017.08); *B22F 12/20* (2021.01); *B33Y 30/00* (2014.12); *B33Y 40/20* (2020.01)

(58) Field of Classification Search
CPC ....... B29C 64/364; B33Y 30/00; B33Y 40/20; B22F 12/20
See application file for complete search history.

(56) References Cited

U.S. PATENT DOCUMENTS

| | | | |
|---|---|---|---|
| 4,703,961 A | 11/1987 | Weinerman et al. |
| 5,234,238 A | 8/1993 | Takimoto |
| 5,787,643 A | 8/1998 | Schmuck |
| 8,720,237 B2 | 5/2014 | Williams |
| 9,175,505 B2 | 11/2015 | Hirukawa |
| 9,260,890 B2 | 2/2016 | Harrison |

(Continued)

FOREIGN PATENT DOCUMENTS

| | | |
|---|---|---|
| CN | 106111986 A | 11/2016 |
| CN | 106799833 A | 6/2017 |

(Continued)

*Primary Examiner* — Mark A Williams
(74) *Attorney, Agent, or Firm* — Shook Hardy & Bacon L.L.P.

(57) ABSTRACT

A cooling unit can be coupled to a build unit of a 3D printing system. The cooling unit comprises a cooling unit opening which is arranged to face a build unit opening when the cooling unit is coupled to the build unit to enable transfer of content from the build unit to the cooling unit. The cooling unit further comprises a self-locking latch mechanism to couple the cooling unit to the build unit such that the cooling unit opening faces the build unit opening.

10 Claims, 9 Drawing Sheets

(56) References Cited

U.S. PATENT DOCUMENTS

| | | | |
|---|---|---|---|
| 10,252,336 B2* | 4/2019 | Buller | B29C 64/364 |
| 10,759,090 B2* | 9/2020 | Gunner | B29C 33/3842 |
| 10,781,846 B2* | 9/2020 | Gunner | F16B 5/0225 |
| 2007/0087071 A1 | 4/2007 | Devos et al. | |
| 2010/0314889 A1 | 12/2010 | Wang et al. | |
| 2015/0042105 A1 | 2/2015 | Promutico et al. | |
| 2015/0314389 A1 | 11/2015 | Yamada | |
| 2016/0236408 A1* | 8/2016 | Wolf | B29C 64/118 |
| 2016/0271871 A1* | 9/2016 | Lee | B29C 48/02 |
| 2016/0297110 A1* | 10/2016 | Wu | B29C 35/16 |
| 2017/0120518 A1* | 5/2017 | DeMuth | B29C 64/268 |
| 2017/0251713 A1* | 9/2017 | Warner | A23P 30/20 |
| 2017/0326803 A1* | 11/2017 | Chanclon | B29C 64/357 |
| 2018/0001567 A1* | 1/2018 | Juan | B22F 10/10 |
| 2018/0111319 A1* | 4/2018 | Brezoczky | B29C 64/255 |
| 2018/0126668 A1* | 5/2018 | El-Siblani | B29C 64/165 |
| 2018/0133956 A1* | 5/2018 | Buller | B33Y 50/02 |
| 2018/0133966 A1* | 5/2018 | Plachner | B22F 12/82 |
| 2018/0141286 A1* | 5/2018 | Davis | B29C 64/153 |
| 2018/0361668 A1 | 12/2018 | Kim et al. | |
| 2018/0361671 A1* | 12/2018 | Bloome | B29C 64/227 |
| 2019/0054730 A1* | 2/2019 | Chanclon | B33Y 30/00 |
| 2019/0134889 A1* | 5/2019 | Roman | B29C 37/0003 |
| 2019/0160750 A1* | 5/2019 | Morral | B22F 12/80 |
| 2019/0210286 A1* | 7/2019 | Newell | B29C 64/379 |
| 2020/0114576 A1* | 4/2020 | De Pena | B33Y 30/00 |
| 2020/0215749 A1* | 7/2020 | Susnjara | B29C 64/118 |
| 2022/0355549 A1* | 11/2022 | Garcia Gomez | B22F 12/38 |

FOREIGN PATENT DOCUMENTS

| | | | |
|---|---|---|---|
| CN | 108068333 A | 5/2018 | |
| CN | 108602271 A | 9/2018 | |
| CN | 108772563 A | 11/2018 | |
| EP | 3363566 A1 | 8/2018 | |
| WO | WO-2017194109 A1 * | 11/2017 | B22F 10/20 |
| WO | 2018/098007 A1 | 5/2018 | |
| WO | WO-2018147868 A1 | 8/2018 | |

* cited by examiner

COOLING UNIT WITH A SELF-LOCKING LATCH MECHANISM

BACKGROUND

The description is related to a three-dimensional (3D) printing system. A 3D printer uses additive printing processes to make 3D objects from a digital 3D object model file. More particularly, the description is related to a cooling unit for cooling content produced in a 3D printing system.

BRIEF DESCRIPTION OF THE DRAWINGS

Features of examples will be described, by way of example, in the following detailed description with reference to the accompanying drawings in which like reference numerals correspond to similar, though perhaps not identical, components. For the sake of brevity, reference numerals or features having a previously described function may or may not be described in connection with other drawings in which they appear.

Non-limiting examples will now be described with reference to the accompanying drawings, in which.

DETAILED DESCRIPTION

Figure 1:
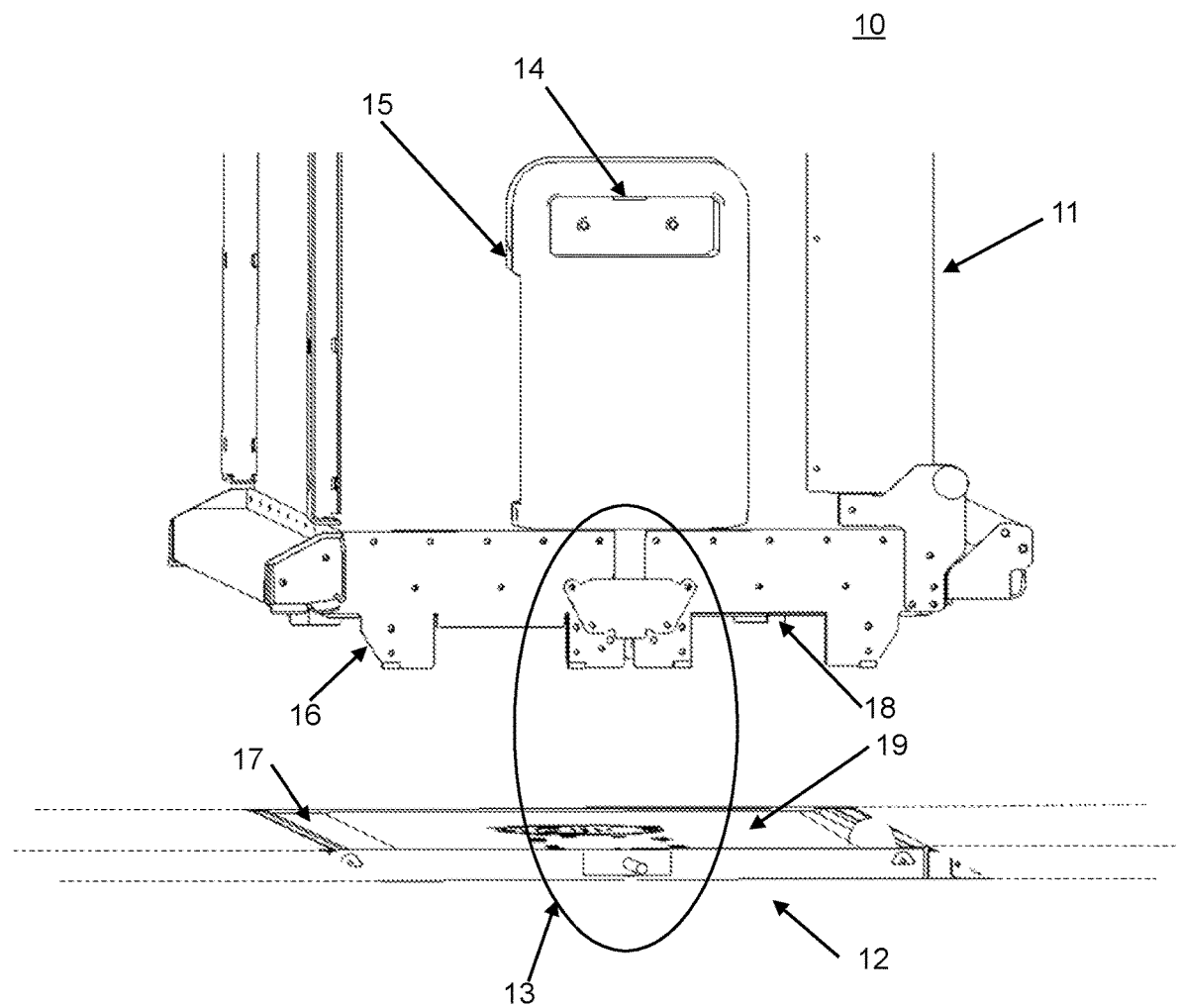
FIG. 1 shows an example of cooling unit coupleable to a build unit of a 3D printing system.

In some 3D printing systems, for example, a 3D object may be formed on a layer-by-layer basis where each layer is processed and combined with a subsequent layer until the 3D object is fully formed. In the following, 3D printing system and 3D printer is used interchangeably with additive manufacturing process and additive manufacturing system, respectively.

In various 3D printing systems, a 3D object being produced may be defined from a 3D object model file. Information in such a 3D object model file comprises 3D geometric information that describes the shape of the 3D model. The 3D geometric information in a 3D object model file may define solid portions of a 3D object to be printed or produced. To produce a 3D object from a 3D object model, the 3D model information may be processed to provide 2D planes or slices of the 3D model. Each 2D slice generally comprises an image and/or data that may define an area or areas of a layer of build material as being solid object areas where the build material is to be solidified during a 3D printing process. In some examples, the build material may be solid material. In other examples, the build material may be a fluid. In yet other examples, the build material may be a combination of both, solid and fluid material.

The 3D object model file may have been generated on a computer system external to the 3D printer. There is a wide range of software applications, e.g. Smart Stream 3D Build Manager, Materialise Magics, Autodesk Meshmixer, AccuTrans, and many more, that support generating 3D object model files to be printed. In these applications, a user may create a 3D object model that may define a physical 3D object to be printed. Each one of those applications may have different functionalities.

In some examples, the printing of a 3D object model may be realized by the interaction of the 3D printing system components. Common 3D printing system components may include a coater, a build unit with a build space or a build bed, a means for moving the build space or other components, a processing unit, a components station, a dosing device and a heating means. In some examples, the build unit may be removable from the 3D printing system. In other examples, the build unit may be fixed to the 3D printing system.

Some 3D printing systems may employ material extrusion such as Fused Deposition Modeling (FDM), vat polymerization such as Stereolithography (SLA) or Digital Light Processing (DLP), powder bed fusion using polymers such as Selective Laser Sintering (SLS), powder bed fusion using metals such as Direct Metal Laser Sintering (DMLS), Selective Laser Melding (SLM), Electron Beam Melding (EBM), material jetting or binder jetting (BaI).

In some powder-bed and binder jetting 3D printing systems a 2D slice of a 3D object model may define areas of a thin powder build material layer that is spread over a print bed in a build unit and that is to receive a liquid functional agent such as a fusing agent or a binding agent. Conversely, areas of a powder layer that are not defined as object areas by a 2D slice comprise non-object areas where the powder is not to be solidified and will not receive a liquid functional agent.

In some 3D printing systems, a 2D slice of a 3D object model may define areas where a heated printer extruder head selectively depositions a continuous filament of thermoplastic material. In some other 3D printing systems, a 2D slice of a 3D object model may define areas where polymers are selectively cured by a source of heat. In yet some other 3D printing system, a 2D slice of a 3D object model may define areas where a nozzle of a print head selectively places a photopolymer which is subsequently cured and solidified with UV light. These processes may be repeated, one layer at a time, until a 3D object or a plurality of 3D objects have been formed within the build area.

In some 3D printing systems, a liquid functional agent, e.g. a fusing or curable binder agent, may be selectively applied to each powder layer in areas where the particles of powdered material are to be fused together or solidified to form a 3D object as defined by each 2D slice of a 3D object model as noted above. Each layer in the build area may be exposed to a fusing energy to thermally fuse together and solidify the particles of powdered material where the fusing agent has been applied. In some other 3D printing system, the layer in the build area may be exposed to a fusing energy without melting it to the point of liquefaction.

Within 3D printing systems, the term "build material" is to be generally understood as a physical substance that can be used to generate an object via 3D printing. Examples for build materials are numerous. They can include, but are not limited to, sand, cements, ceramics, textiles, biomaterials such as wood particles or lactose powders, glass, resins, or plastics, photopolymers, thermoplastics, metals such as eutectic metals, metal alloys, metal-binder mixtures, fibrous and powder-like materials. In some examples the powder may be formed from, or may include, short fibres that may, for example, have been cut into short lengths from long strands or threads of material.

Some 3D printing system processes are enabled or improved by pre- or post-heating a target area in the build unit. Some examples for a heated target area may include a print head, a melding device or an interior of the build unit. Some heating of a target area may be realized through a laser beam, electron beam or UV beam. In some example of powder-based 3D printing systems, a laser beam or electron beam may be applied to each powder layer to heat the powder above the powder's melting point to fuse this powder layer to the preceding one.

Upon printing order completion, the printed objects may be too hot for further processing or direct application. The cooling down of the printed objects may have to comply with certain standards for desired material properties. In some examples, the cooling of the printed objects may take a certain time period. In some examples, the ambience air of the printed objects may have to be regulated by means of a certain standard.

Upon printing order completion, the build unit of the 3D printing system may contain content such as the printed objects, residual build material as well as residual artifacts. Before realizing a new printing order, the build unit content such as the printed objects, residual build material as well as the artifacts need to be removed from the build unit to avoid undesired conglomeration with subsequent printing orders and thus to reduce error probability of printed objects.

Upon printing order completion, the cooling of the finished objects within the build unit may suspend continuous utilization of the build unit for production of objects. Within powder-based 3D printing systems, it may also involve repeated cooling down and heating up of the interior of the build unit for subsequent printing orders. The cooling of the finished objects thus represents a bottle-neck for scheduling multiple 3D printing processes.

Displacing finished objects to a purpose-built cooling unit instead of leaving the finished objects within the build unit for cooling may enhance efficiency of the 3D printing system. The transfer of finished objects to a cooling unit may allow a continuous scheduling of printing processes in the build unit and thus increase productivity. The cooling unit may reduce cooling times which results in faster time-to-part and more parts already within the same day. This may be particularly relevant for mass production areas.

The cooling unit may be a moveable container outside the main components of the 3D printing system, such as printer, build unit and processing station. The cooling unit may be securely coupleable to the build unit of the 3D printing system for transfer of the finished objects. The cooling unit may be equipped with a temperature regulation system. The cooling unit may be equipped with air regulation and/or ventilation systems.

Once the content of a build unit has been transferred from the build unit to the cooling unit, the cooling unit may be decoupled from the build unit and removed from the build unit. The 3D printing system is now ready to for a subsequent new printing order. The content which results from the subsequent printing order may be transferred to another cooling unit. This process may be repeated to increase throughput of the 3D printing system.

Misplacement of the cooling unit on the build unit may imply difficulties such that finished objects may be damaged during the transfer from the build unit to the cooling unit. Misplacement of the cooling unit on the build unit may also imply spillage of other content of the build unit such as remaining build material or residual artifacts. To avoid damage of the finished objects as well as spillage of remaining build material, the cooling unit has to be always securely coupled to the build unit such that a seamless and reliable transfer is possible.

A self-locking mechanism may ensure that the cooling unit is always reliably and securely coupled to the build unit. A self-locking mechanism may dispense additional coupling efforts in the process which saves time and reduces errors. By also dispensing user involvement, a self-locking mechanism may increase reliability as it avoids potential human errors.

In some examples, the cooling unit may have arrangements for manual transport by a user. In other examples, the cooling unit may have arrangements for machine-aided transport. The arrangements for machine-aided transport may be particularly helpful in automated production.

In some examples, the self-locking mechanism may be easy releasable yet ensures robust and reliable coupling of the cooling unit to the build unit. An easy releasable mechanism may dispense additional decoupling efforts in the process which saves time and reduces errors. By also dispensing user involvement, an easy releasable mechanism may increase reliability as it avoids potential human errors.

FIGS. 1-11 show a cooling unit with a self-locking latch mechanism or corresponding methods wherein like reference numerals correspond to the same components. Now referring to FIG. 1 which shows an example of a cooling unit 11 coupleable to a build unit 12 of a 3D printing system 10. In some examples, the cooling unit 11 may be a cuboid container. In other examples, the cooling unit 11 may be a cubic container or some differently shaped container. The cooling unit 11 may form an interior to temporarily contain content from the build unit such as a printed object, residual build material as well as artifacts for cooling. In some examples, the cooling unit may include some cooling mechanism. The cooling unit 11 is coupleable to the build unit 12 via a self-locking latch mechanism 13 to allow a safe and seamless transfer of content such as printed object, residual build material as well as artifacts from the build unit 12 to the cooling unit 11. In some examples, the self-locking latch mechanism 13 may be arranged at two opposite, outward facing sides of the cooling unit. In some examples, the self-locking latch mechanism may include magnetic latches. In other examples, the self-locking latch mechanism may include mechanic latches.

In some examples, the cooling unit 11 may have a cooling unit opening 18 at one side of the cooling unit. In some examples, the build unit 12 may have a build unit opening 19 at one side of the build unit 12. In some examples, the cooling unit opening 18 may be a bottom opening of the cooling unit 11. In some examples, the build unit opening may be a top opening of the build unit 12. In some other examples, the cooling unit opening 18 and the build unit opening 19 may be lateral openings of the cooling unit 11 and the build unit 12. In yet some other examples, the cooling unit opening 18 may be a top opening of the cooling unit 11 and the build unit opening 19 may be a bottom opening of the build unit. The cooling unit opening 18 may be arranged to face the build unit opening 19 when the cooling unit is coupled to the build unit to enable transfer of content from the build unit 12 to the cooling unit 11. Further, the self-locking latch mechanism 13 couples the cooling unit 11 to the build unit 12 such that the cooling unit opening 18 faces the build unit opening 19.

In some examples, a handle for a user 14 may be mounted to the cooling unit 11. In other examples, a handle for a forklift 15 may be mounted to the cooling unit 11. Some cooling units 11 may comprise both, a handle for a user 14 and a handle for a forklift 15. The handle for a user 14 and handle for a forklift 15 may be mounted laterally on two opposite, outward facing sides of the cooling unit 11. The handle for a user 14 and the handle for a forklift 15 may be aligned linearly to each other on each side. In some examples, both the handle for a user 14 and the handle for a forklift 15 may be integrated in a veneer.

In some examples, the forks of a forklift may engage with the handle for a forklift 31. In other examples, the forks of some machine-aided transport mechanism may engage with the handle for a forklift 31.

In some examples, guiding elements 16 may be provided at the cooling unit 11 and guiding elements 17 may be provided at the build unit 12. In some examples, the guiding elements 16 may match the guiding elements 17 in that they are counterparts. The guiding elements may support the correct alignment of the cooling unit 11 and the build unit 12 when positioning the cooling unit 11 on the build unit to enable self-locking of the latch mechanism 13. The guiding elements 16 may be formed as elements which protrude from the cooling unit 11 and which are oriented to face the building unit 12. The guiding elements 17 may be formed as recesses to receive the guiding elements 16 upon alignment of the cooling unit 11 and the build unit 12. In some examples, the guiding elements 16 and the guiding elements 17 may support the correct alignment of the cooling unit 11 on the build unit 12 in the plane parallel to the cooling unit opening 18 and the build unit opening 19. In some examples, the guiding elements 16 and the guiding elements 17 may support the correct alignment of the cooling unit 11 and the build unit 12 in the two dimensions of the above-mentioned parallel plane.

In some examples, the cooling unit 11 and the build unit 12 are coupleable conclusively such that intermediate openings to the exterior are avoided. This may reduce the risk of content falling outside during the transfer from the build unit 12 to the cooling unit 11. It may also reduce the risk of damaging printed objects at protruding edges. It may further avoid spillage of remaining build material or residual artifacts. The coupling of the cooling unit 11 to the build unit 12 has to be secure such that a seamless and reliable transfer is possible.

Figure 2:
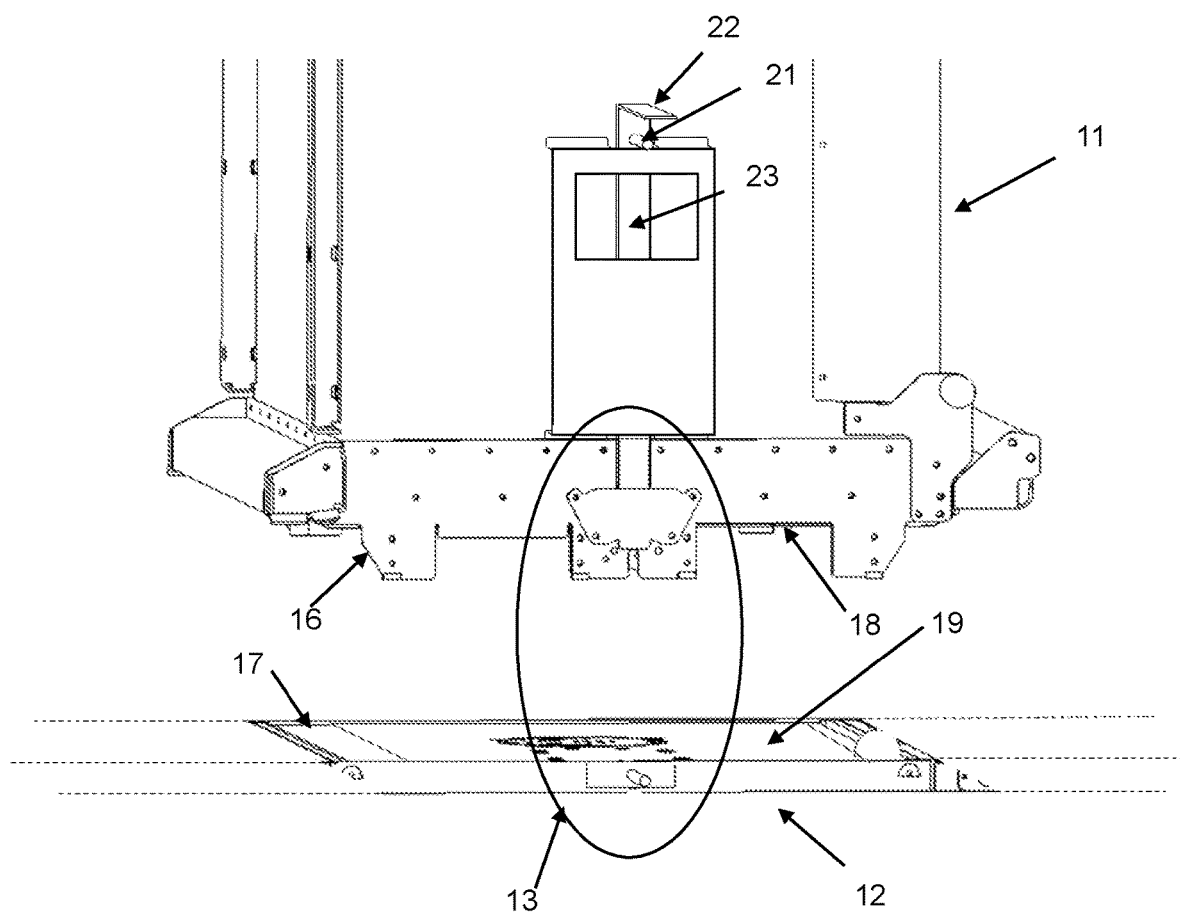
FIG. 2 shows further details of an example of a cooling unit coupleable to a 3D printing system.

FIG. 2 shows further details of an example 3D printing system 10 which comprises a build unit 11 and a cooling unit 12. In some examples, the forklift operating handle 15 may comprise a first actuating member 21 that is connected to the self-locking latch mechanism 13. In other examples, the user operating handle 14 may comprise a second actuating member 22 that is connected to the self-locking latch mechanism 13. In some other examples, the first actuating member 21 and the second actuating member 22 are mounted on a connector 23 that connects the first and second actuating member to the self-locking latch mechanism 13. In some examples, the connector 23 may be a common bar, cable or rope.

Figure 3:
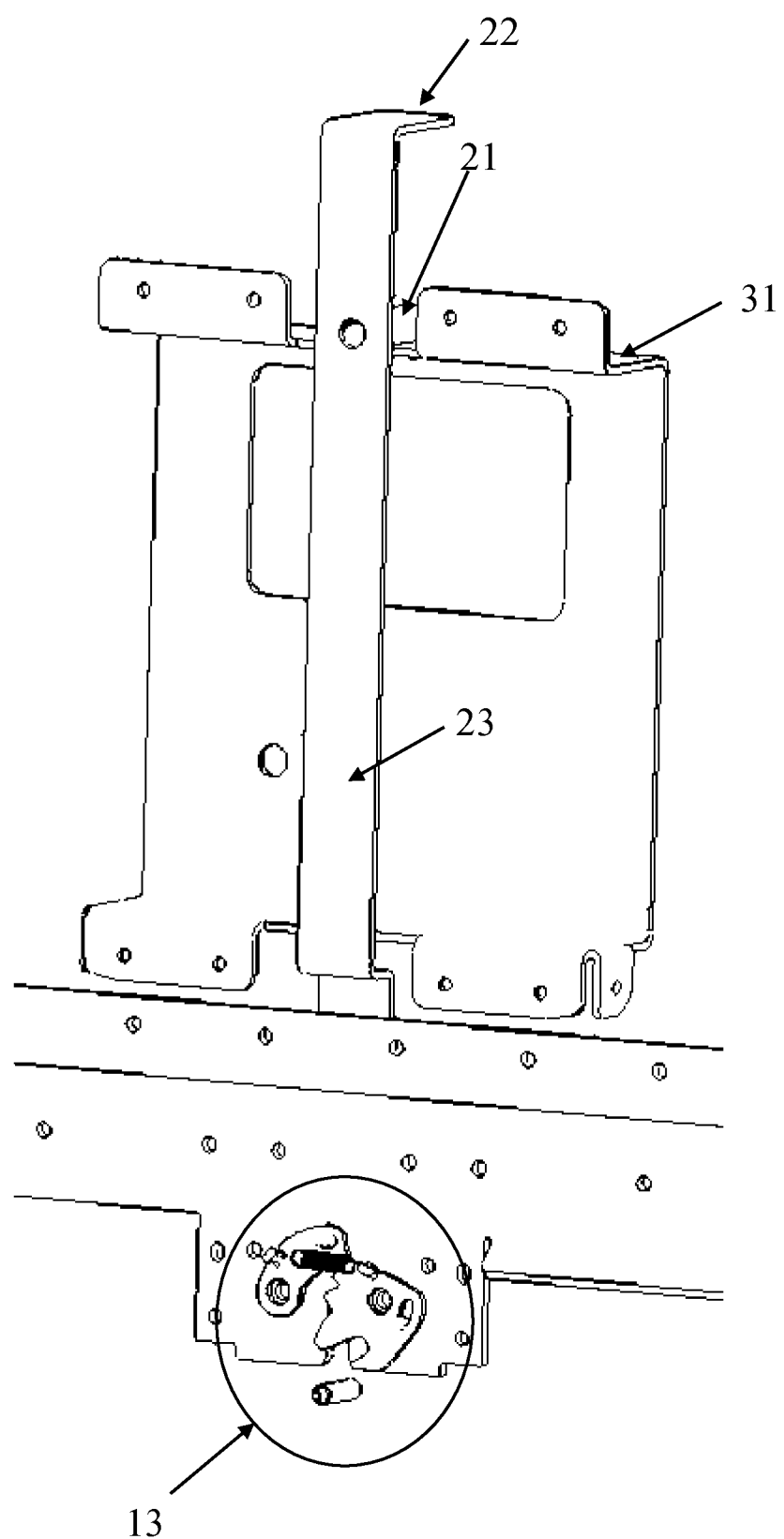
FIG. 3 shows an example of a connector between the mechanical self-locking latch mechanism and a first and a second actuating member.

FIG. 3 illustrates another perspective of a connector 23 which may physically connect a first actuating member 21 or a second actuating member 22 to the self-locking latch mechanism 13. The connector 23 may also physically connect both, the first actuating member 21 and second actuating member 22 to the self-locking latch mechanism 13. The first actuating member 21 may be a protrusion that is partially integrated with a handle for a forklift 31 while it protrudes from the handle for a forklift 31.

Figure 4:
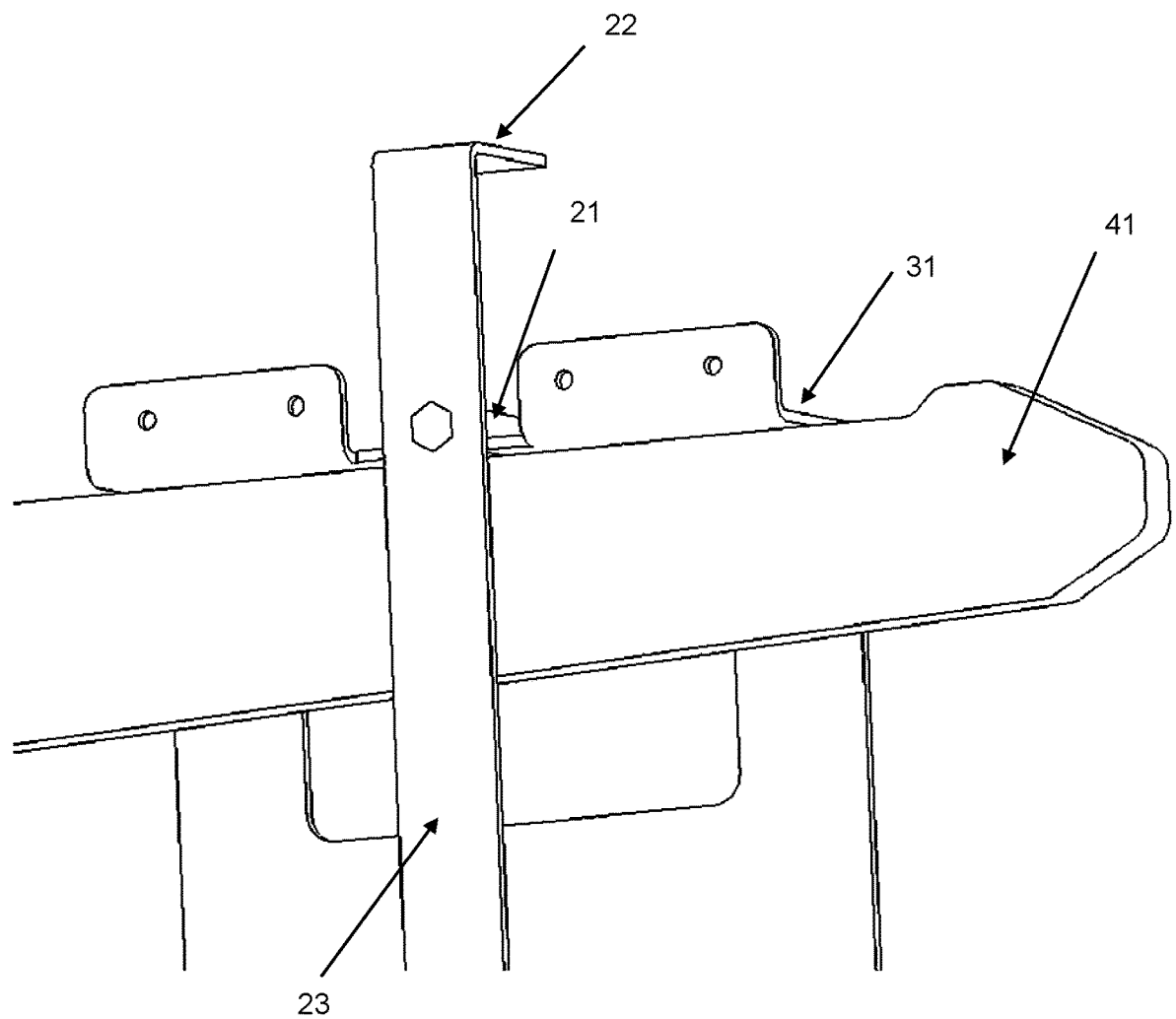
FIG. 4 shows an example of an actuating member actuated by a fork of a forklift.

Now turning to FIG. 4 which shows an example of a fork of a forklift 41 engaging with the handle for a forklift 31 for displacing the cooling unit 11. The fork of a forklift 41 may be guided to the proximity of the handle for a forklift 31 of the cooling unit 11. In one example, upon lifting the cooling unit 11, the fork of the forklift may push against the handle unit for a forklift 31 thereby displacing the protruding first actuating member 21 and the therewith connected connector 23. In another example, the connector 23 may be displaced by manually pushing the second actuating member 22. In some examples, the first actuating member 21 may be a roller, pin or button. In some examples, the second actuating member 22 may be a release puller.

Figure 5:
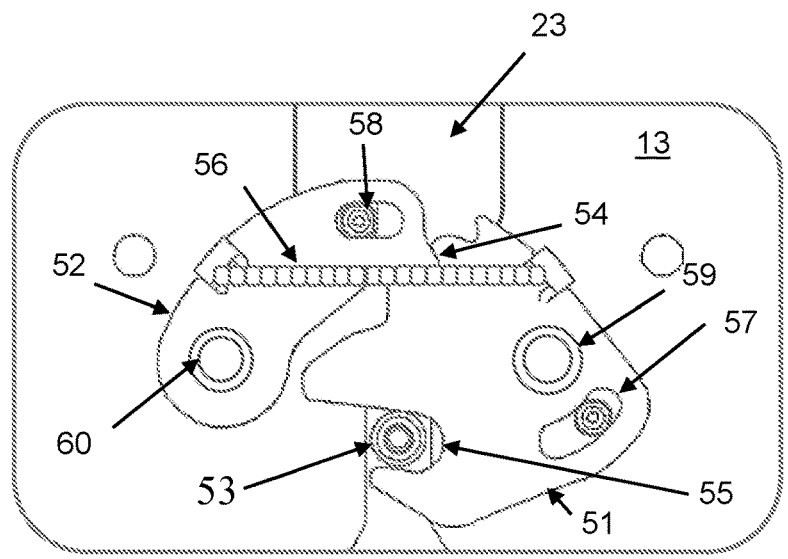
FIG. 5-FIG. 7 show examples of an engagement process of an example of the mechanical self-locking latch mechanism.

FIG. 5 illustrates an example of a self-locking latch mechanism 13 which may comprise a ratchet 51, a pawl 52 and a keeper 53. In some examples, the ratchet 51 may be rotatably mounted to the cooling unit 11. In some examples, the pawl 52 may be rotatably mounted to the cooling unit 11. The pawl 52 may be physically connected to the connector 23. The keeper 53 may be mounted to the build unit 12. In other examples, the ratchet 51 and pawl 52 may be mounted to the build unit and the keeper 53 may be mounted to the cooling unit. In some examples, the keeper may comprise a pin or a loop.

The ratchet 51 may have one keeper engagement notch 55 to engage with the keeper 53. The ratchet 51 may be mounted such that its keeper engagement notch 55 is oriented towards the keeper 53. The ratchet 51 may further have at least one pawl engagement notch 54 to engage with the pawl 52. The ratchet 51 may be mounted such that the at least one pawl engagement notch 55 of the ratchet 51 may be oriented towards the pawl 52.

The ratchet 51 and the pawl 52 may be connected to each other via a tensioner 56. In some examples, the tensioner 56 may be a spring, such as a coil spring, a mainspring or a volute spring. In other examples, the tensioner may be a rubber band.

A ratchet guiding mechanism 57 may limit the possible rotational movement of the ratchet 51 to a needed angular range. The ratchet guiding mechanism 57 may comprise a recess in the ratchet 51 and a pin mounted to the cooling unit 11 which extends through the recess. A pawl guiding mechanism 58 may transform linear movement of the connector 23 into rotational movement of the pawl 52 around the pawl fulcrum 60. The pawl guiding mechanism 58 may comprise a recess in the pawl 52 and a pin mounted to the connector 23 of the cooling unit 11 which extends through the recess.

In some examples, the pawl 52 may have a nose-formed protrusion that may represent the counterpart to the pawl engagement notch 55 of the ratchet 51. In some examples, this nose-formed protrusion may be located at the end of the pawl 52 which is opposite to the fulcrum of the pawl 60.

FIG. 5 further illustrates the correct alignment of the self-locking latch mechanism 13 which is achieved with support of the above-mentioned guiding elements provided at the cooling unit 11 and the build unit 12. These guiding elements direct the keeper engagement notch 55 towards the keeper 53 when the cooling unit 11 is coupled to the build unit 12.

Still referring to FIG. 5 which shows the self-locking latch mechanism 13 upon coupling the cooling unit 11 on the build unit 12. With the downward movement of the cooling unit 11, the ratchet 51 rotates around the ratchet fulcrum 59 and engages with the keeper 53. Thereby, the tensioner 56 rotates the pawl 52 around the pawl fulcrum 60 until it engages in the at least one pawl engagement notch 54 of ratchet 51 to self-lock the ratchet 51 with the keeper 53.

Figure 6:
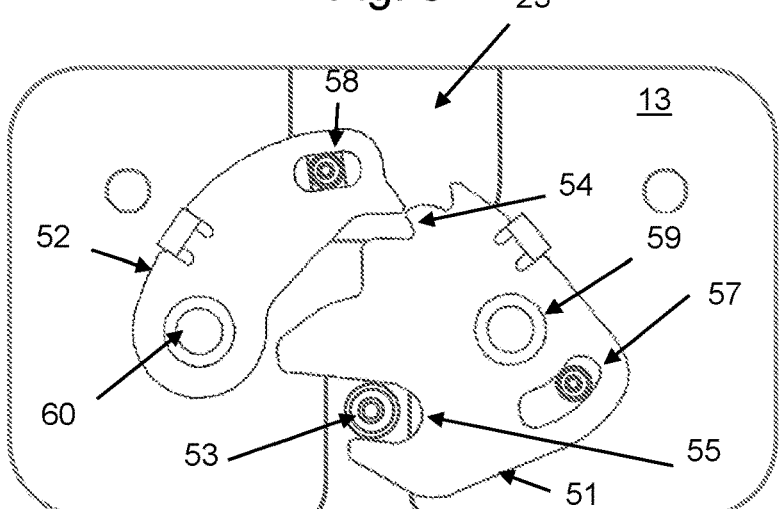

FIG. 6. shows the self-locking latch mechanism 13 upon its disengagement.

In one example, the first actuating member 21 has been actuated by a fork of a forklift by lifting the cooling unit. In another example, the second actuating member 22 has been actuated by a user when lifting the cooling unit 11. Thereby, the connector 23 rotates the pawl 52 around the pawl fulcrum 60 against the tensioning force of the tensioner 56. By that, the pawl 52 disengages from the at least one pawl engagement notch 54 of the ratchet 51. The rotational movement of the ratchet 51 is now deblocked such that the ratchet may self-unlock from the keeper 53.

It may be worthwhile to repeat that the disengagement of the self-locking latch mechanism 13 does not represent an additional process but can be achieved simultaneously when moving the cooling unit 11. When a user grabs the handle for a user 14, the user may touch the second actuating member with one finger while lifting the cooling unit 11. When a fork of a forklift engages with the handle for a forklift 15 and lifts the cooling unit 11, the first actuating member will be automatically touched.

Figure 7:
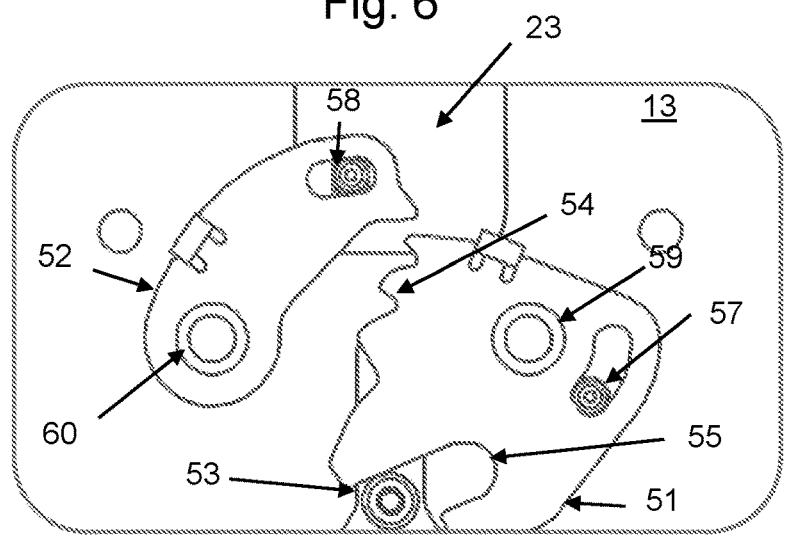

FIG. 7 illustrates the example of further lifting the cooling unit 11 from the build unit 12 which rotates the ratchet 51 even more to completely release the keeper 53 from the keeper notch 55.

Figure 8:
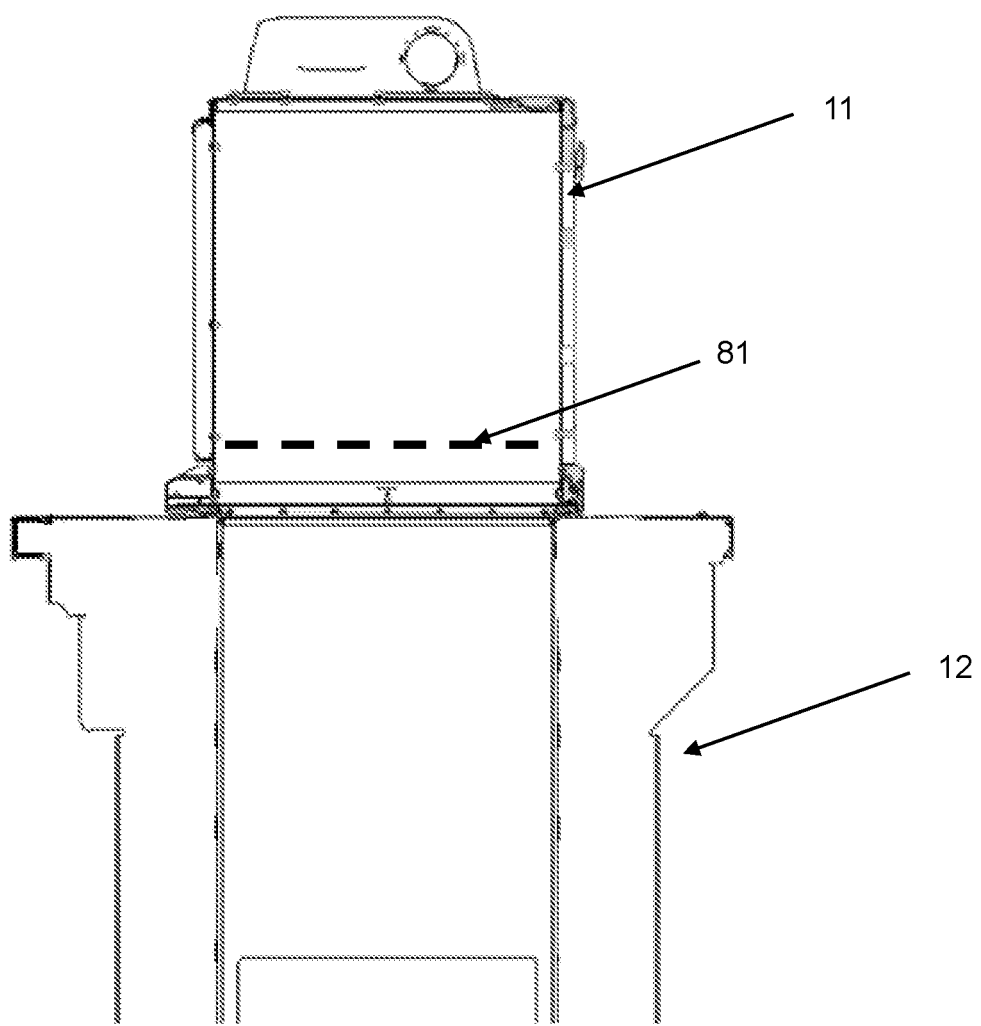
FIG. 8 shows an example of introducing a slide-in bottom between a cooling unit and a build unit of a 3D printing system.

FIG. 8 shows an example of the cooling unit 11 coupled to the build unit 12 to transfer content from the build unit 12 to the cooling unit 11. Transferring the object may include lifting the content on an elevating platform through a top opening 19 of the build unit 12 and a bottom opening 18 of the cooling unit 11. If may further include introducing a slide-in bottom 81 between the platform and the content once the content has been lifted into the cooling unit.

Figure 9:
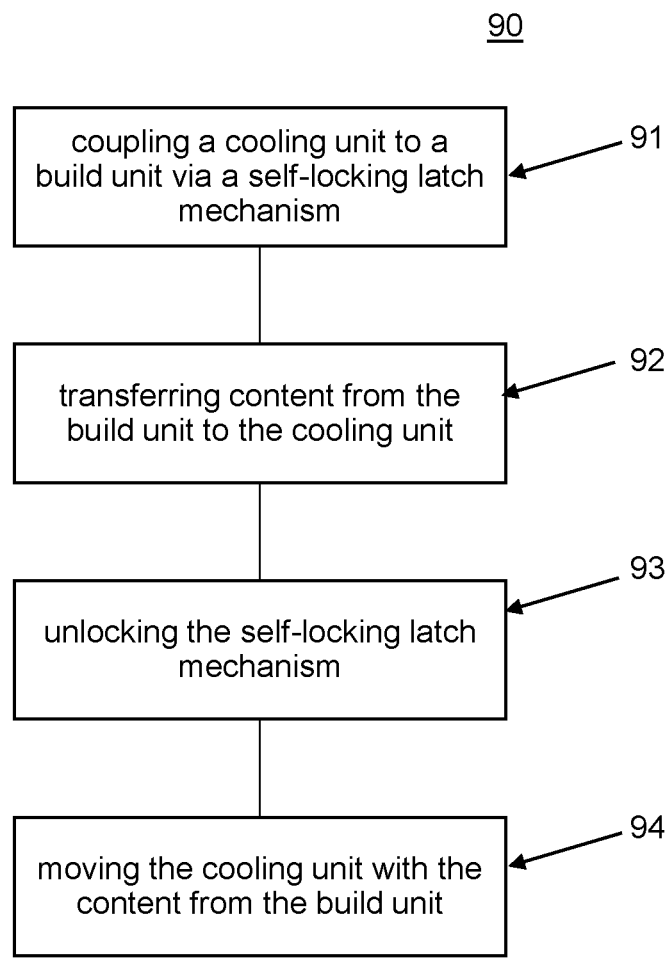
FIG. 9-FIG. 11 show examples of a coupling method of a cooling unit to a build unit of a 3D printing system for transfer of content from the build unit to the cooling unit.

FIG. 9 illustrates a method 90 for cooling content in a 3D printing system. The method 90 comprises coupling a cooling unit 11 to a build unit 12 via a self-locking latch mechanism 13 at block 91. Subsequently, the content from the build unit 12 is transferred to the cooling unit 11 at block 92. The content is now securely enclosed in the cooling unit 11 such that the cooling unit 11 can be unlocked from the build unit via unlocking the self-locking latch mechanism at block 93. Lastly, the cooling unit 11 is moved with the content from the build unit 12 at block 94.

Transferring content from a build unit 12 to a cooling unit 11 may serve economy of time as the cooling process takes place outside the main components of the 3D printing system as mentioned above. It may further serve economy of time as in addition to printed objects, residual building material and artifacts are also transferred from the build unit 12 to the cooling unit 11 which may make a cleaning process of the build bed 12 obsolete.

Figure 10:
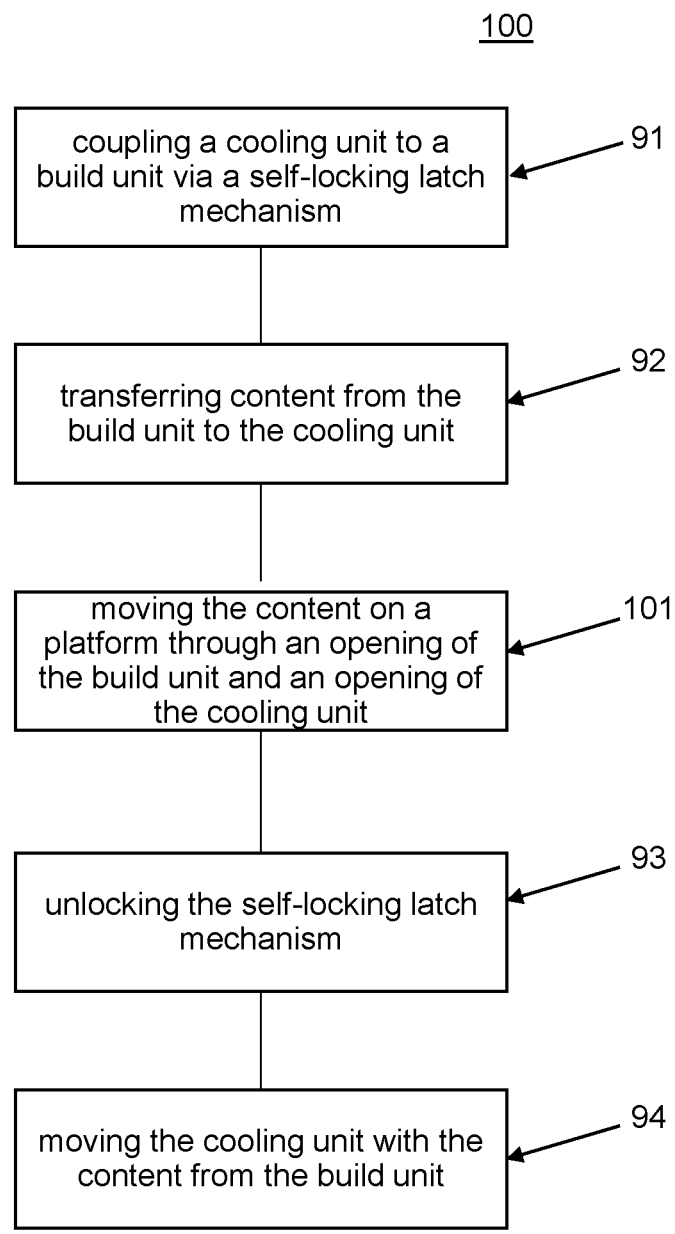

FIG. 10 further illustrates a method 100 for cooling content in a 3D printing system. In order to transfer content from a build unit 12 to the cooling unit 11, the content of the build unit 12 is moved on a platform through an opening of the build unit 19 and an opening of the cooling unit 18 at block 101. In some examples, the opening of the build unit 19 and the opening of the cooling unit 18 are in the same place and are embraced by some physical delamination to the exterior in order to avoid spillage of residual build material, such as powder. After securely transferring the content to the cooling unit 11, the self-locking mechanism 13 may be unlocked at block 93 and the cooling unit 11 may be moved from the build unit 12 at block 94.

Figure 11:
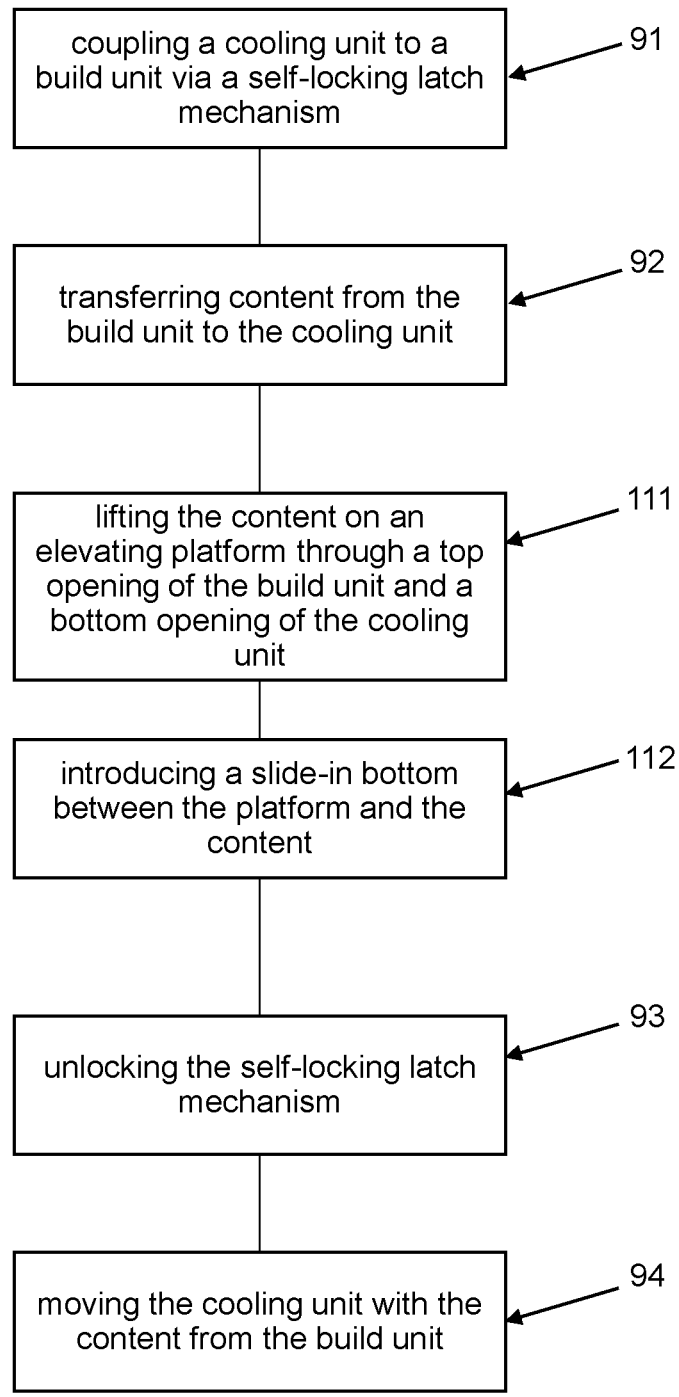

Also FIG. 11 shows a method 110 for cooling content in a 3D printing system. The method 110 details that for transferring content from the build unit 12 to the cooling unit 11, the content may be lifted on an elevating platform through a top opening of the build unit and a bottom opening of the cooling unit at block 111. It further details that a slide-in bottom may be introduced between the elevating platform and the content once the elevating platform has lifted the content into the cooling unit 11 at block 112. The cooling unit now contains the content which is positioned on the slide-in bottom. Consequently, the content had been transferred to the cooling unit such that the self-locking latch mechanism may be unlocked at block 93 and the cooling unit may be moved from the build unit at block 94. Again, the cooling unit may be moved from the build unit manually by a user or by machine-aided transport mechanism.

In some examples, the cooling unit 11 may be coupled on top of the build unit with the self-locking latch mechanism and lifted from the build unit for subsequent cooling. In some other examples, the cooling unit and the build unit may be coupled next to each other with the self-locking latch mechanism. Transferring content from the build unit to the cooling unit may include lateral movement. In yet some other examples, the build unit may be coupled on top of the cooling unit with the self-locking latch mechanism Transferring a content from the build unit to the cooling unit may include downward movement.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents.

It should be noted that the above-mentioned examples illustrate rather than limit what is described herein, and that those skilled in the art will be able to design many alternative implementations without departing from the scope of the appended claims. Features described in relation to one example may be combined with features of another example.

What is claimed is:

1. A cooling unit coupleable to a build unit of a 3D printing system, the cooling unit comprising:
    a cooling unit having a cooling unit opening on a first side of the cooling unit, wherein the cooling unit opening on the first side of the cooling unit is arranged to face a build unit opening on a first side of the build unit when the cooling unit is coupled to the build unit to transfer content from the build unit to the cooling unit through the build unit opening and the cooling unit opening in a 3D printing process, and
    a self-locking latch mechanism to couple the cooling unit to the build unit such that the cooling unit opening faces the build unit opening, wherein a first component of the self-locking latch mechanism mounted to the cooling unit is engaged with a second component of the self-locking latch mechanism mounted to the build unit upon alignment of the cooling unit opening on the first side of the cooling unit with the build unit opening on the first side of the build unit.

2. The cooling unit according to claim 1, further comprising a handle for a user to move the cooling unit to and from the build unit, and an actuating member to unlock the self-locking latch mechanism, wherein the actuating member is integrated into the handle for the user and arranged to be actuated by the user.

3. The cooling unit according to claim 1, further comprising a handle for a forklift to move the cooling unit to and from the build unit, and an actuating member to unlock the self-locking latch mechanism, wherein the actuating member is integrated into the handle for the forklift and arranged to be actuated by a fork of the forklift.

4. The cooling unit according to claim 1, wherein the cooling unit comprises a forklift operating handle for a forklift to move the cooling unit from the build unit and a handle for a user to move the cooling unit from the build unit, and first and second actuating members to unlock the self-locking latch mechanism, wherein the first actuating member is integrated into the handle for a forklift and arranged to be actuated by a fork of the forklift and the second actuating member is aligned with the handle and arranged to be actuated by the user, and wherein the first and second actuating members are connected with the self-locking latch mechanism via a connector.

5. The cooling unit according to claim 4, wherein the first actuating member comprises a protrusion which is positioned on the connector and protrudes from the handle for a forklift such as to be actuated when the fork of the forklift engages with the handle for a forklift.

6. The cooling unit according to claim 1, wherein the self-locking latch mechanism comprises a ratchet and a pawl which are rotatably mounted to the cooling unit and which are arranged to engage with a keeper which is mounted to the build unit.

7. The cooling unit according to claim 6, wherein the ratchet has at least one pawl engagement notch to engage with the pawl and another keeper engagement notch to engage with the keeper.

8. The cooling unit according to claim 7, wherein the ratchet and pawl are connected to each other via a tensioner such that by coupling the cooling unit to the build unit the ratchet engages with the keeper and rotates around the ratchet fulcrum, thereby rotating the pawl by means of the tensioner into engagement of the at least one pawl engagement notch of the ratchet to self-lock the ratchet on the keeper.

9. The cooling unit according to claim 4, comprising an actuating member to unlock the self-locking latch mechanism wherein the actuating member is connected with a connector that is connected to the self-locking latch mechanism such that by actuating the actuating member the connector rotates the pawl against the tensioning force of the tensioner until the pawl disengages from the at least one pawl engagement notch of the ratchet to unlock the ratchet from the keeper.

10. The cooling unit according to claim 7, further comprising guiding elements to guide the keeper engagement notch towards the keeper when coupling the cooling unit to the build unit.

* * * * *